(12) United States Patent
Wu

(10) Patent No.: US 12,154,187 B1
(45) Date of Patent: Nov. 26, 2024

(54) WATERMARK PROCESSING METHOD, ELECTRONIC DEVICE, AND STORAGE MEDIUM

(71) Applicant: Ruijie Networks Co., Ltd., Fuzhou (CN)

(72) Inventor: Ying Wu, Fujian (CN)

(73) Assignee: Ruijie Networks Co., Ltd., Fuzhou (CN)

( * ) Notice: Subject to any disclaimer, the term of this patent is extended or adjusted under 35 U.S.C. 154(b) by 0 days.

(21) Appl. No.: 18/792,058

(22) Filed: Aug. 1, 2024

Related U.S. Application Data

(63) Continuation of application No. PCT/CN2023/142121, filed on Dec. 26, 2023.

(30) Foreign Application Priority Data

Dec. 27, 2022 (CN) .......................... 202211715034.X

(51) Int. Cl.
*G06T 1/00* (2006.01)
*G06T 7/11* (2017.01)
*G06T 7/90* (2017.01)
*G06T 11/00* (2006.01)

(52) U.S. Cl.
CPC .............. *G06T 1/0028* (2013.01); *G06T 7/11* (2017.01); *G06T 7/90* (2017.01); *G06T 11/001* (2013.01); *G06T 2207/10024* (2013.01); *G06T 2207/20021* (2013.01); *G06T 2207/20092* (2013.01); *G06T 2210/62* (2013.01)

(58) Field of Classification Search
None
See application file for complete search history.

(56) References Cited

U.S. PATENT DOCUMENTS

| | | | |
|---|---|---|---|
| 6,590,996 B1* | 7/2003 | Reed ................... | H04N 1/32352 348/460 |
| 2006/0227996 A1* | 10/2006 | Kunieda ............ | H04N 1/32309 382/100 |
| 2010/0215342 A1* | 8/2010 | Lee ........................ | H04N 5/913 386/E5.003 |

(Continued)

FOREIGN PATENT DOCUMENTS

| CN | 104867095 A | 8/2015 |
|---|---|---|
| CN | 106023059 A | 10/2016 |

(Continued)

OTHER PUBLICATIONS

International Search Report and Written Opinion received for PCT Patent Application No. PCT/CN2023/142121, mailed on Mar. 21, 2024, 12 pages (5 pages of English Translation and 7 pages of Original Document).

*Primary Examiner* — James A Thompson
(74) *Attorney, Agent, or Firm* — ArentFox Schiff LLP; Michael Fainberg

(57) ABSTRACT

This application discloses a watermark processing method, an electronic device, and a storage medium. The watermark processing method includes: obtaining to-be-inserted watermark information; setting a transparent image layer on a display screen of a terminal based on a size of an image layer window, where the size of the image layer window is determined based on a size of the display screen of the terminal; and drawing the watermark information on the transparent image layer at specified transparency.

13 Claims, 7 Drawing Sheets

(56) References Cited

U.S. PATENT DOCUMENTS

2016/0012564 A1* 1/2016 Ma .................. G06T 1/0021
                                                    382/100
2019/0045078 A1* 2/2019 Tung ................ H04N 1/32229

FOREIGN PATENT DOCUMENTS

| | | | |
|---|---|---|---|
| CN | 107862647 A | 3/2018 | |
| CN | 110838083 A | 2/2020 | |
| CN | 114331796 A | 4/2022 | |
| EP | 1548642 A2 * | 6/2005 | ........... G06T 1/0028 |

* cited by examiner

WATERMARK PROCESSING METHOD, ELECTRONIC DEVICE, AND STORAGE MEDIUM

CROSS-REFERENCE TO RELATED APPLICATIONS

This application is a continuation of International Patent Application No. PCT/CN2023/142121, filed on Dec. 26, 2023, and entitled "WATERMARK PROCESSING METHOD AND APPARATUS, ELECTRONIC DEVICE, AND STORAGE MEDIUM", which claims priority to Chinese Patent Application No. 202211715034.X, filed with the China National Intellectual Property Administration on Dec. 27, 2022 and entitled "WATERMARK PROCESSING METHOD AND APPARATUS, ELECTRONIC DEVICE, AND STORAGE MEDIUM", both of which are incorporated herein by reference in its entirety.

TECHNICAL FIELD

This application relates to the field of image processing technologies, and in particular, to a watermark processing method, an electronic device, and a storage medium.

BACKGROUND

With development of Internet technologies, there is an increasing quantity of remote office, collaborative office, and online cooperation scenarios, and it becomes increasingly easy to obtain an electronic document. To enable traceability after important electronic document information is leaked, a perceivable watermark is added to an important electronic document in the related art. The watermark on the electronic document carries user identity information. When the electronic document is leaked, a user who leaks the electronic document may be found through tracing based on the watermark on the electronic document.

However, the perceivable watermark has specific impact on reading by a user. Therefore, an unperceivable watermarking technology has been increasingly widely used. An unperceivable watermark is a watermark that a user is unaware of. Watermark information, such as document source information and user information, is added to an electronic document. When the electronic document is leaked, the watermark information may be restored to implement traceability of the electronic document.

SUMMARY

Embodiments of this application provide a watermark processing method and apparatus, an electronic device, and a storage medium.

According to a first aspect, an embodiment of this application provides a watermark processing method, including:
obtaining to-be-inserted watermark information;
setting a transparent image layer on a display screen of a terminal based on a size of an image layer window, where the size of the image layer window is determined based on a size of the display screen of the terminal; and
drawing the watermark information on the transparent image layer at specified transparency.
In a possible implementation, the setting the transparent image layer on a display screen of the terminal based on the size of the image layer window specifically includes:
drawing the image layer window into transparent by using a transparent brush to obtain the transparent image layer; and
setting the transparent image layer at a top layer of the display screen of the terminal.
In a possible implementation, the method further includes:
determining whether the display screen of the terminal includes a plurality of sub-screens; and
when the display screen of the terminal includes the plurality of sub-screens, determining the size of the image layer window based on sizes of the plurality of sub-screens.
In a possible implementation, the determining the size of the image layer window based on the sizes of the plurality of sub-screens includes:
arranging the plurality of sub-screens according to a preset rule, where a size of each sub-screen is a corresponding size in a maximum resolution.
In a possible implementation, the arranging the plurality of sub-screens according to the preset rule includes:
arranging each sub-screen in a diagonal line.
In a possible implementation, the method further includes:
obtaining an image with a to-be-restored watermark, where the image with the to-be-restored watermark is an image captured by the terminal or an image frame of a video recorded by the terminal;
dividing the image with the to-be-restored watermark into a corresponding quantity of image blocks based on a preset size;
obtaining a first color value with a largest quantity among color values of pixels in each image block respectively;
determining a first color value with a largest quantity among all first color values as a reference color value;
determining, based on a correspondence between a preset second color value and a first restoring color level value, a restoring color level value corresponding to the reference color value; and
adjusting a color level of the image with the to-be-restored watermark based on the restoring color level value corresponding to the reference color value, to obtain an image with a restored watermark.
In a possible implementation, the method further includes:
drawing, at the specified transparency, a specified watermark on a solid-color canvas corresponding to each color value, to obtain a corresponding watermarked solid-color canvas;
for each watermarked solid-color canvas, adjusting a color level of the watermarked solid-color canvas based on each color level value to obtain a plurality of corresponding watermark-restored canvases;
determining a contrast between a color value of a watermarked pixel and a color value of a non-watermarked pixel in each watermark-restored canvas;
selecting a color level value, from at least one color level value corresponding to a watermark-restored canvas whose contrast is greater than a specified threshold, as a first restoring color level value corresponding to a second color value of a pixel in a corresponding solid-color canvas prior to being watermarked; and
obtaining the correspondence based on the second color value and the first restoring color level value corresponding to the second color value.
In a possible implementation, the determining a contrast between a color value of a watermarked pixel and a color value of a non-watermarked pixel in each watermark-restored canvas specifically includes:

determining the contrast of the corresponding watermark-restored canvas based on a difference between the color value of the watermarked pixel and the color value of the non-watermarked pixel in each watermark-restored canvas.

In a possible implementation, the difference is a distance difference between the color value of the watermarked pixel and the color value of the non-watermarked pixel in each watermark-restored canvas.

In a possible implementation, the difference is determined by using the following formula:

$$D=|\sqrt{r_0^2+g_0^2+b_0^2}-\sqrt{r_1^2+g_1^2+b_1^2}|, \text{ where}$$

$(r_0, g_0, b_0)$ is the color value of the watermarked pixel in the watermark-restored canvas, $(r_1, g_1, b_1)$ is the color value of the non-watermarked pixel in the watermark-restored canvas, and D is the difference.

In a possible implementation, the for each watermarked solid-color canvas, adjusting a color level of the watermarked solid-color canvas based on each color level value to obtain a plurality of corresponding watermark-restored canvases includes:

adjusting the color level value of each watermarked solid-color canvas into each color level value in a color level table to obtain the plurality of corresponding watermark-restored canvases.

In a possible implementation, the method further includes:

responding to a screenshot operation or a screen recording operation performed on the terminal; and writing, by using a hook function, the watermark information into an image captured by the terminal or a video recorded by the terminal.

According to a second aspect, an embodiment of this application provides a watermark processing apparatus, including:

a first obtaining unit, configured to obtain to-be-inserted watermark information;

a setting unit, configured to set a transparent image layer on a display screen of a terminal based on a size of an image layer window, where the size of the image layer window is determined based on a size of the display screen of the terminal; and a first watermarking unit, configured to draw the watermark information on the transparent image layer at specified transparency.

In a possible implementation, the setting unit is specifically configured to: draw the image layer window into transparent by using a transparent brush to obtain the transparent image layer; and set the transparent image layer at a top layer of the display screen of the terminal.

In a possible implementation, the setting unit is further configured to: determine whether the display screen of the terminal includes a plurality of sub-screens; and when the display screen of the terminal includes the plurality of sub-screens, determine the size of the image layer window based on sizes of the plurality of sub-screens.

In a possible implementation, the setting unit is further configured to arrange the plurality of sub-screens according to a preset rule, where a size of each sub-screen is a corresponding size in a maximum resolution.

In a possible implementation, the setting unit is further configured to arrange each sub-screen in a diagonal line.

In a possible implementation, the apparatus further includes:

a second obtaining unit, configured to obtain an image with a to-be-restored watermark, where the image with the to-be-restored watermark is an image captured by the terminal or an image frame of a video recorded by the terminal;

a division unit, configured to divide the image with the to-be-restored watermark into a corresponding quantity of image blocks based on a preset size;

a third obtaining unit, configured to obtain a first color value with a largest quantity among color values of pixels in each image block respectively;

a first determining unit, configured to determine a first color value with a largest quantity among all first color values as a reference color value;

a second determining unit, configured to determine, based on a correspondence between a preset second color value and a first restoring color level value, a restoring color level value corresponding to the reference color value; and a watermark restoration unit, configured to adjust a color level of the image with the to-be-restored watermark based on the restoring color level value corresponding to the reference color value, to obtain an image with a restored watermark.

In a possible implementation, the apparatus further includes:

a second watermarking unit, configured to draw, at the specified transparency, a specified watermark on a solid-color canvas corresponding to each color value, to obtain a corresponding watermarked solid-color canvas;

a color level adjustment unit, configured to: for each watermarked solid-color canvas, adjust a color level of the watermarked solid-color canvas based on each color level value to obtain a plurality of corresponding watermark-restored canvases;

a third determining unit, configured to determine a contrast between a color value of a watermarked pixel and a color value of a non-watermarked pixel in each watermark-restored canvas;

a selection unit, configured to select a color level value, from at least one color level value corresponding to a watermark-restored canvas whose contrast is greater than a specified threshold, as a first restoring color level value corresponding to a second color value of a pixel in a corresponding solid-color canvas prior to being watermarked; and an obtaining unit, configured to obtain the correspondence based on the second color value and the first restoring color level value corresponding to the second color value.

In a possible implementation, the third determining unit is specifically configured to determine the contrast of the corresponding watermark-restored canvas based on a difference between the color value of the watermarked pixel and the color value of the non-watermarked pixel in each watermark-restored canvas.

In a possible implementation, the difference is a distance difference between the color value of the watermarked pixel and the color value of the non-watermarked pixel in each watermark-restored canvas.

The difference is determined by using the following formula:

$$D=|\sqrt{r_0^2+g_0^2+b_0^2}-\sqrt{r_1^2+g_1^2+b_1^2}|, \text{ where}$$

$(r_0, g_0, b_0)$ is the color value of the watermarked pixel in the watermark-restored canvas, $(r_1, g_1, b_1)$ is the color value of the non-watermarked pixel in the watermark-restored canvas, and D is the difference.

In a possible implementation, the for each watermarked solid-color canvas, adjusting a color level of the watermarked solid-color canvas based on each color level value to obtain a plurality of corresponding watermark-restored canvases includes:

adjusting the color level value of each watermarked solid-color canvas into each color level value in a color level table to obtain the plurality of corresponding watermark-restored canvases.

In a possible implementation, the apparatus further includes:

a response unit, configured to respond to a screenshot operation or a screen recording operation performed on the terminal; and a writing unit, configured to write, by using a hook function, the watermark information into an image captured by the terminal or a video recorded by the terminal.

According to a third aspect, an embodiment of this application provides an electronic device, including a memory, a processor, and a computer program stored in the memory and capable of running on the processor, where when the processor executes the program, the watermark processing method in this application is implemented.

According to a fourth aspect, an embodiment of this application provides a computer-readable storage medium, where the computer-readable storage medium stores a computer program, and when the program is executed by a processor, the steps of the watermark processing method in this application are implemented.

According to the watermark processing method and apparatus, the electronic device, and the storage medium provided in the embodiments of this application, to-be-inserted watermark information is obtained, a transparent image layer is set on a display screen of a terminal, and the watermark information is drawn on the transparent image layer at specified transparency. In this way, watermark information is drawn on a transparent image layer on a screen of a user terminal without inserting the watermark information into an original image, so that integrity of the original image is not changed. When a user captures, by using screenshot software of a terminal, a screenshot generated based on content of an electronic document being viewed, or records a video by using screen recording software, a system hook (hook) function technology of the terminal can ensure that an image frame obtained by the screenshot or screen recording software carries unperceivable watermark information. According to the watermarking processing method and apparatus, the electronic device, and the storage medium provided in the embodiments of this application, watermark information may be directly restored from a screenshot or an image frame of a video, without training by a large quantity of watermark samples, so that applicability is high. In addition, it can be ensured that added watermark information does not damage integrity of an image, and watermark recognition effect is improved.

Other features and advantages of this application will be set forth later in the specification, and in part will be readily apparent from the specification, or may be understood by implementing this application. Objectives and other advantages of this application may be achieved and obtained by using a structure particularly stated in the written specification, claims, and accompanying drawings.

BRIEF DESCRIPTION OF DRAWINGS

To describe technical solutions in embodiments of this application or in the conventional technology more clearly, the following briefly describes accompanying drawings for describing the embodiments or the conventional technology. Clearly, the accompanying drawings in the following descriptions show merely some embodiments of this application, and a person of ordinary skill in the art may still derive drawings for other embodiments from these accompanying drawings without creative efforts.

The accompanying drawings described herein are intended for better understanding of this application, and constitute a part of this application. Exemplary embodiments and descriptions thereof in this application are intended to interpret this application and do not constitute any improper limitation on this application.

DESCRIPTION OF EMBODIMENTS

Figure 1:
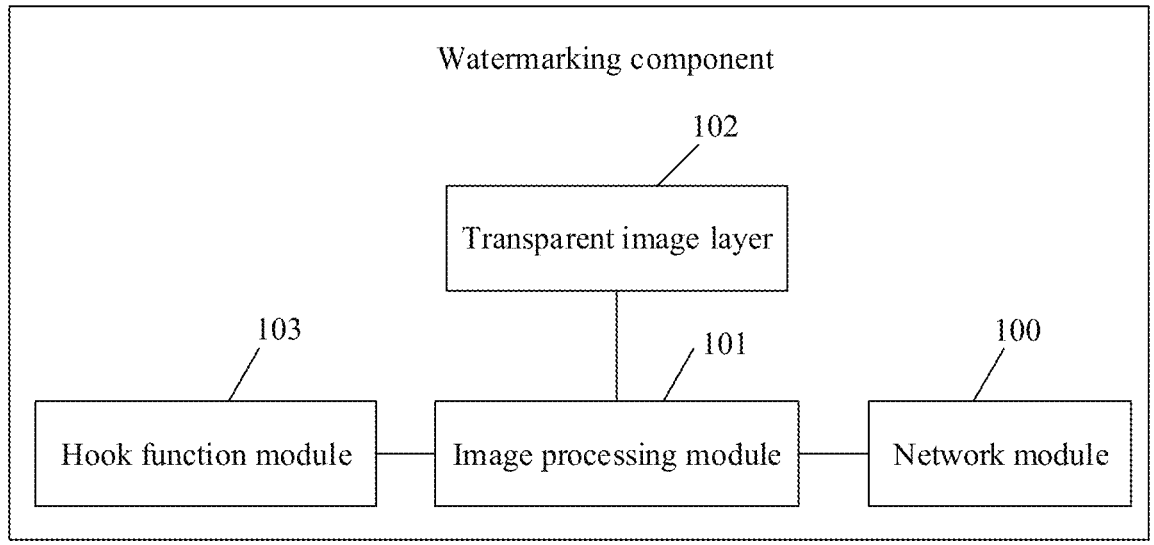
FIG. 1 is a structural diagram of a watermarking component according to an embodiment of this application.

To make the objectives, technical solutions, and advantages of the embodiments of this application clearer, the following clearly and thoroughly describes the technical solutions of this application with reference to the accompanying drawings in the embodiments of this application. Apparently, the described embodiments are some but not all of the embodiments of this application. All other embodiments obtained by a person of ordinary skill in the art based on the embodiments described in this application document without creative efforts shall fall within the protection scope of the technical solutions of this application.

In the specification, claims, and accompanying drawings of this application, the terms "first" and "second" are used to distinguish between different objects, and not intended to describe a specific order. In addition, the term "include" and any other variant thereof are intended to cover non-exclusive protection. For example, a process, method, system, product, or device that includes a list of steps or units is not limited to the listed steps or units, but optionally includes steps or units not listed, or optionally includes other steps or units inherent to the process, method, system, product, or device. The term "a plurality of" in this application may mean at least two, for example, two, three, or more. However, the embodiments of this application are not limited thereto.

In addition, the term "and/or" in this specification describes only an association relationship for describing associated objects and represents that three relationships may exist. For example, A and/or B may represent the following three cases: Only A exists, both A and B exist, and only B exists. In addition, unless otherwise specified, the character "/" in this specification usually indicates an "or" relationship between associated objects.

Conventional unperceivable watermarking technologies are mainly classified into the following two categories.

A first category is a deep-learning-based unperceivable watermark processing method for an image. A main implementation means is to pre-train a classification model for recognizing whether an image includes a mark point. During recognition of a target image to which a watermark dot matrix is added, the classification model is used to perform classification based on whether a point location image of each point location includes a mark point, and a watermark dot matrix is obtained from an output result of the classification model. Then source information of an image is restored based on the watermark dot matrix. However, in this method, a server needs to continuously perform learning, and a classification model needs to be trained by performing machine learning on a large quantity of training watermark samples to increase a recognition rate. However, watermark samples formed based on information of different users are different. Therefore, effect achieved by this method is limited.

A second category is a space-domain-based unperceivable watermark processing method for an image. A main implementation means is to use a digital slight-chromatic-aberration processing technology for an image to draw watermark information on an original image by changing RGB values of image pixels. In this manner, slight chromatic aberration that is not easily found by human eyes may appear on an image. If a user leaks electronic document information through a screenshot, screen recording, or the like, watermark restoration may be performed on a leaked image or video to find a responsible person through tracing. However, in this method, the watermark information is directly drawn on the original image. This damages integrity of the original image.

FIG. 1 is a structural diagram of a watermarking component according to an embodiment of this application. The watermarking component may be applied to a terminal, and the watermarking component is configured to add an unperceivable watermark. The watermarking component may include a network module 100, an image processing module 101, and a transparent image layer 102, and may further include a hook (Hook) function module 103. The network module 100 obtains to-be-added watermark information, and sends the watermark information to the image processing module 101. The image processing module 101 determines a size of an image layer window based on a size of a display screen of the terminal, so that the image layer window can fully cover the display screen; and draws the image layer window with a determined size into transparent by using a transparent brush to obtain the transparent image layer 102. The transparent image layer is set at a top layer of the display screen of the terminal, and the watermark information is drawn on the transparent image layer 102 laid on the display screen of the terminal by using a brush with a color of specified transparency. The specified transparency may be set according to a requirement. For example, an alpha channel value of the color of the brush (namely, an alpha channel value of a watermark pattern) is set to 2. The alpha channel value of the watermark pattern may also be set to another value, provided that the setting enables a user to be visually unaware of the watermark pattern.

To prevent a failure of drawing a watermark on the transparent image layer 102, in this embodiment of this application, when it is detected that a user performs a screenshot operation by using screenshot software on the terminal or performs a screen recording operation by using screen recording software on the terminal, the hook function module 103 may directly write the watermark information into an image captured by the terminal and/or a video recorded by the terminal.

Figure 2:
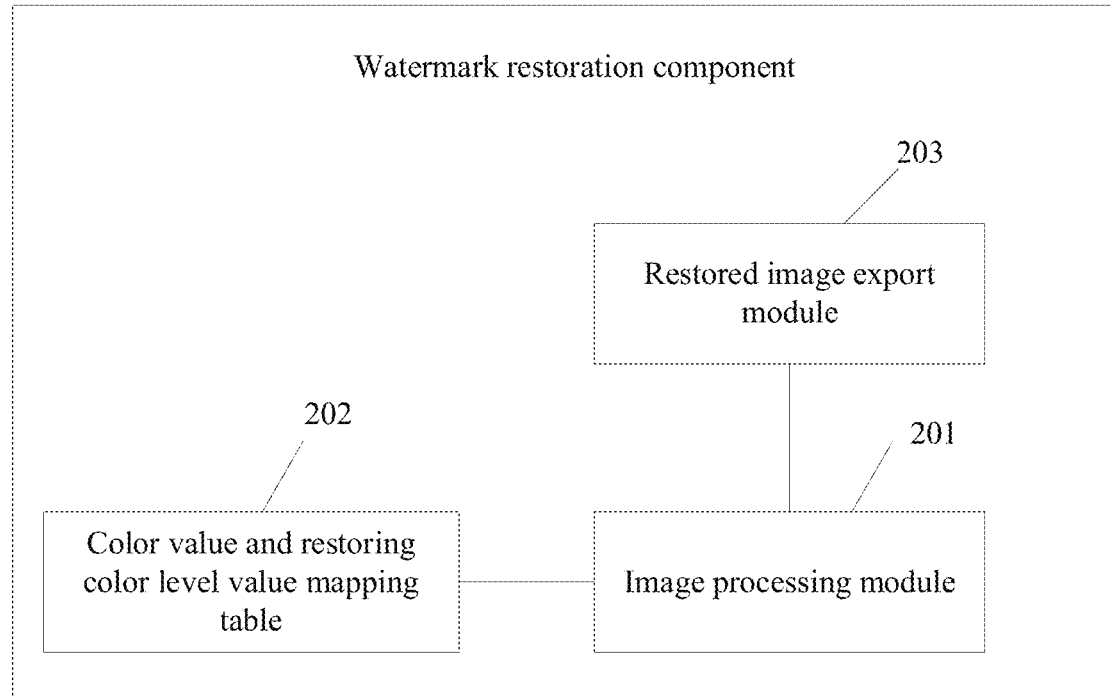
FIG. 2 is a structural diagram of a watermark restoration component according to an embodiment of this application.

FIG. 2 is a structural diagram of a watermark restoration component according to an embodiment of this application. The watermark restoration component is configured to restore an unperceivable watermark. The watermark restoration component may include an image processing module 201, a color value and restoring color level value mapping table (namely, a correspondence between a color value and a restoring color level value) 202, and a restored image export module 203. The image processing module 201 obtains an image with a to-be-restored watermark, divides the image with the to-be-restored watermark into a corresponding quantity of image blocks based on a preset size, obtains a color value with a largest quantity among RGB color values of pixels in each image block, and denotes the color value as a first color value. A first color value with a largest quantity among all first color values is determined as a reference color value. A restoring color level value corresponding to the reference color value is determined based on the preset color value and restoring color level value mapping table 202. A color level of the image with the to-be-restored watermark is adjusted based on the determined restoring color level value to obtain an image with a restored watermark. The image processing module 201 sends the image with the restored watermark to the restored image export module 203, and the restored image export module 203 exports the image with the restored watermark.

It should be noted that a system of the terminal in this embodiment of this application includes a hook (hook) function, and may be but is not limited to a Windows system. This is not limited in this embodiment of this application.

Figure 3:
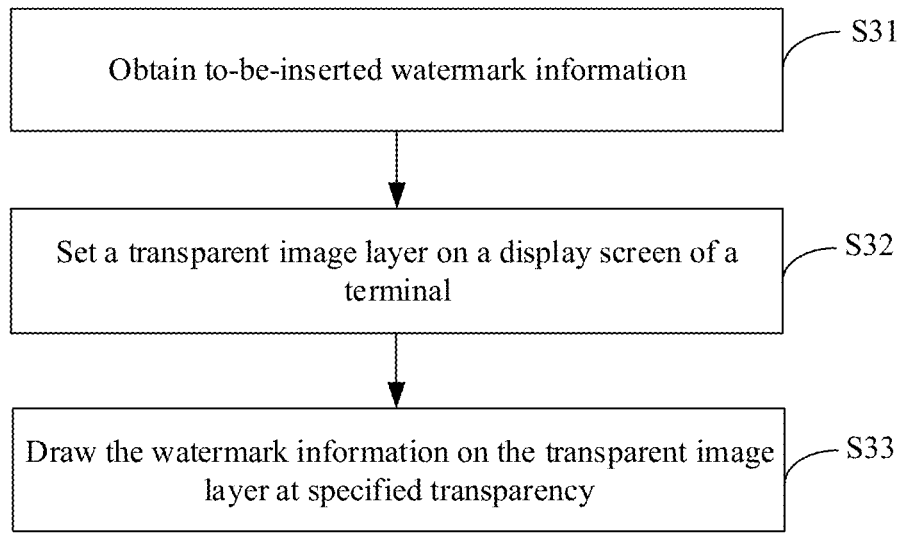
FIG. 3 is a schematic diagram of an implementation process of a watermark processing method according to an embodiment of this application.

FIG. 3 is a schematic diagram of an implementation process of a watermark processing method according to an embodiment of this application. The method may specifically include the following steps.

S31: Obtain to-be-inserted watermark information.

During specific implementation, the watermarking component and the watermark restoration component in the embodiments of this application are installed and run on a (user) terminal, and the terminal obtains the to-be-inserted watermark information by using the watermarking component. The watermark information may include source information of an electronic document, and information about a user using the terminal, for example, user identification information. The watermark information may be sent by an administrator to the user terminal through a management terminal.

S32: Set a transparent image layer on a display screen of the terminal.

Figure 4:
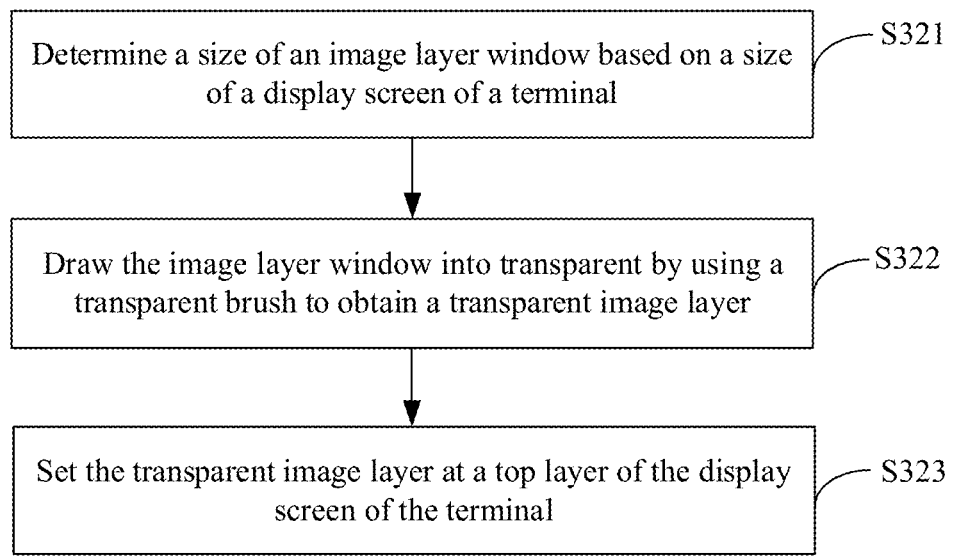
FIG. 4 is a schematic diagram of an implementation process of setting a transparent image layer on a display screen of a terminal according to an embodiment of this application.

During specific implementation, the watermarking component may set the transparent image layer on the display screen of the terminal through a process shown in FIG. 4, including the following steps. S321: Determine a size of an image layer window based on a size of the display screen of the terminal.

The size of the display screen of the terminal is a screen size of a screen corresponding to a desktop used by a user of the terminal.

In an embodiment, a plurality of desktops may be simultaneously used on a user terminal, where each desktop corresponds to a sub-screen. A plurality of sub-screens constitute the display screen of the terminal.

During specific implementation, a user may use desktops corresponding to a plurality of sub-screens. To ensure that a transparent image layer can fully cover all screens, a current quantity of sub-screens of the terminal and a corresponding size of each sub-screen at a maximum resolution are obtained, and the size of the display screen of the terminal is determined correspondingly.

In an embodiment, each sub-screen at the maximum resolution may be arranged in a diagonal line, and a size of a rectangle corresponding to the diagonal line is used as the size of the image layer window.

For example, two desktops are simultaneously used on the user terminal, and the two desktops respectively correspond to a first sub-screen and a second sub-screen. The first sub-screen at the maximum resolution and the second sub-screen at the maximum resolution are arranged along a diagonal line. To be specific, a diagonal line of the first sub-screen and a diagonal line of the second sub-screen are aligned to form a combined diagonal line. A size of a rectangle corresponding to the combined diagonal is used as the size of the image layer window.

A rectangle of a total screen size that may fully cover all screens is obtained, and a size of the rectangle is determined as the size of the image layer window. The size of the image layer window is adjusted to the size of the calculated rectangle that can fully cover all screens.

S322: Draw the image layer window into transparent by using a transparent brush to obtain the transparent image layer.

During specific implementation, the transparent image layer is obtained based on the determined image layer window. During implementation, the image layer window may be drawn into transparent by using the transparent brush to obtain the transparent image layer.

S323: Set the transparent image layer at a top layer of the display screen of the terminal.

During specific implementation, coordinates of an upper left corner of the screen are obtained in real time, and the transparent image layer is set at the top layer of the display screen of the terminal by using the coordinates of the upper left corner of the screen as a starting point of the transparent image layer. This can ensure that the transparent image layer fully covers all screens of the terminal.

S33: Draw the watermark information on the transparent image layer at specified transparency.

During specific implementation, the watermarking component may draw the watermark information on the transparent image layer by using a brush with a color of the specified transparency. The specified transparency may be set according to a requirement. For example, an alpha channel value of the color of the brush may be set to 2. This is not limited in this embodiment of this application.

In an implementation, when the watermarking component detects that a user performs a screenshot operation on content of an electronic document being viewed by using screenshot software on the terminal or performs a screen recording operation by using screen recording software on the terminal, in response to the screenshot operation or the screen recording operation on the terminal, the watermarking component writes, by using a hook function, the watermark information into an image captured by the terminal or a video recorded by the terminal. In this way, if the content of the electronic document is leaked when a watermark fails to be drawn on the transparent image layer, watermark information in a screenshot or a recorded video can still be restored to trace a user who leaks the content.

When a user of the terminal performs a screenshot operation or the video recording operation, a hook technology of a Windows system on the terminal can ensure that an image frame obtained by the screenshot or video recording software includes unperceivable watermark information. Then the watermark information may be directly restored from a screenshot or an image frame of a video to trace a user who leaks the screenshot or the video.

Figure 5:
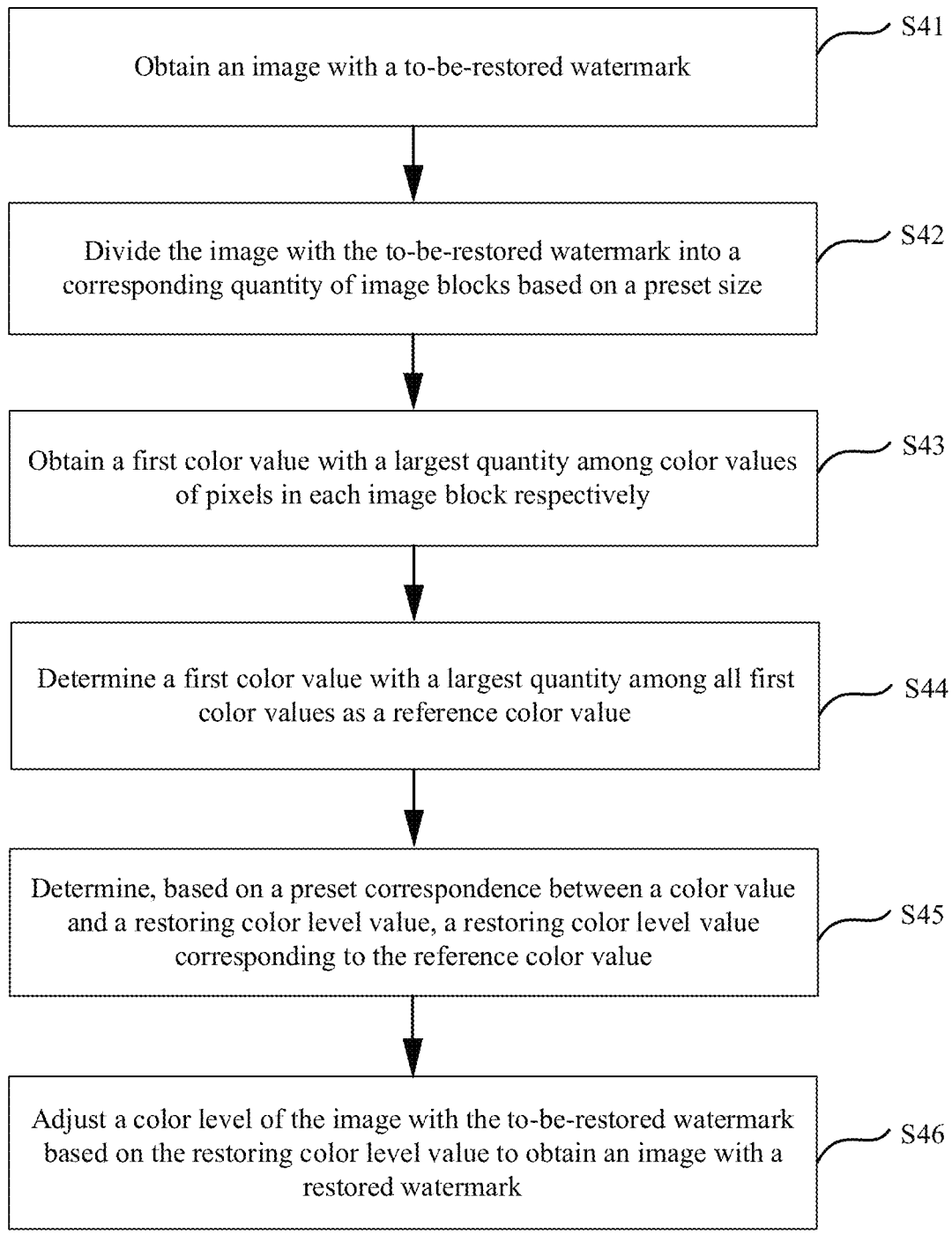
FIG. 5 is a schematic diagram of an implementation process of watermark restoration according to an embodiment of this application.

Specifically, restoring watermark information in an image according to a process shown in FIG. 5 may include the following steps.

S41: Obtain an image with a to-be-restored watermark.

During specific implementation, a terminal obtains the image with the to-be-restored watermark by using a watermark restoration component. The image with the to-be-restored watermark is an image captured by the terminal or an image frame of a video recorded by the terminal. The terminal may capture an image by using screenshot software installed on the terminal, and the terminal may record a video by using screen recording software installed on the terminal.

S42: Divide the image with the to-be-restored watermark into a corresponding quantity of image blocks based on a preset size.

During specific implementation, the image with the to-be-restored watermark that is obtained by the watermark restoration component is divided into the corresponding quantity of image blocks based on the preset size. The preset size may be set according to an actual requirement. For example, the preset size may be set to 200×200 (pixels). This is not limited in this embodiment of this application.

S43: Obtain a first color value with a largest quantity among color values of pixels in each image block respectively.

During specific implementation, for each image block, the watermark restoration component may denote, as a first color value, RGB color values of pixels with a largest quantity among RGB color values of pixels in the image block, namely, a mode of the RGB color values of the pixels in the image block. For example, an image block includes 70,000 pixels, and a quantity of pixels with RGB color values of (10, 10, 10) is 50,000, which is a largest quantity. In this case, the RGB color values (10, 10, 10) of the pixels are determined as a first color value of the image block.

S44: Determine a first color value with a largest quantity among all first color values as a reference color value.

During specific implementation, each image block corresponds to a first color value, and a first color value with a largest quantity among all first color values, namely, a mode of the first color values, is determined as the reference color value.

S45: Determine, based on a preset correspondence between a color value and a restoring color level value, a restoring color level value corresponding to the reference color value.

During specific implementation, a correspondence between a color value and a restoring color level value (namely, the foregoing color value and restoring color level value mapping table) is preset in the watermark restoration component, and the restoring color level value corresponding to the reference color value is queried from the correspondence between a color value and a restoring color level value.

Figure 6:
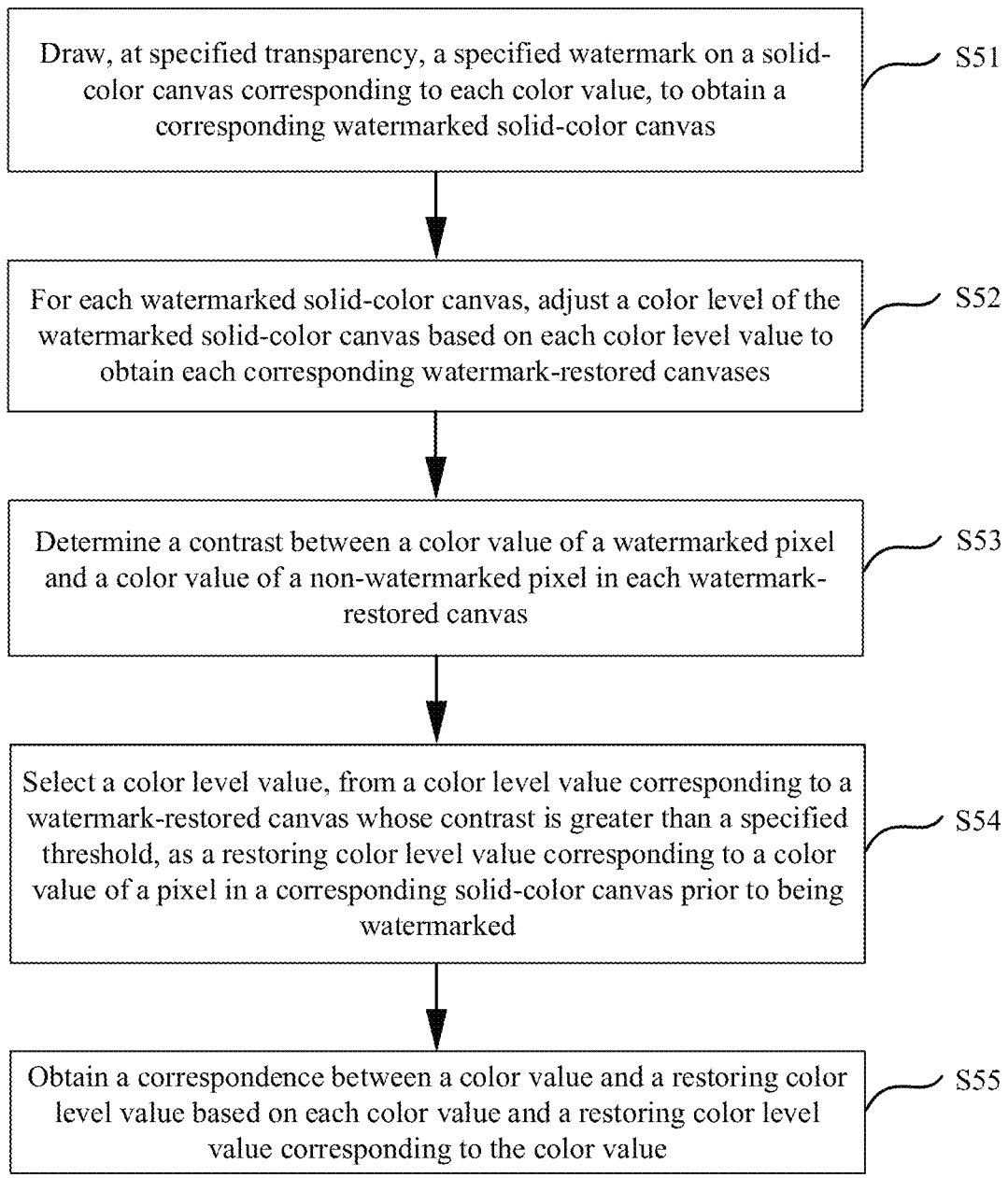
FIG. 6 is a schematic diagram of an implementation process of determining a correspondence between a color value and a restoring color level value according to an embodiment of this application.

In a possible implementation, the watermark restoration component may determine the correspondence between a color value and a restoring color level value through a process shown in FIG. 6.

S51: Draw, at specified transparency, a specified watermark on a solid-color canvas corresponding to each color value, to obtain a corresponding watermarked solid-color canvas.

During specific implementation, values of R, G, and B range from 0 to 255, and a corresponding solid-color canvas is set based on RGB color values ranging from (0, 0, 0) to (255, 255, 255). In this way, $255^3$ solid-color canvases can be obtained. Color values of pixels on a same solid-color canvas are the same. A specified watermark is drawn on each of the $255^3$ solid-color canvases at specified transparency, to obtain $255^3$ corresponding watermarked solid-color canvases. The specified transparency is consistent with transparency used by the watermarking component to add a watermark. Details are not described herein again. The specified watermark may be any text information or information in other display forms.

S52: For each watermarked solid-color canvas, adjust a color level of the watermarked solid-color canvas based on each color level value to obtain each corresponding watermark-restored canvases.

During specific implementation, the following step is performed on each solid-color canvas to which the specified watermark is added.

For the watermarked solid-color canvas, each color level value in a color level table is traversed to restore the watermark. The color level includes a white field, a gray field, and a black field. A color level value includes (a white field value, a gray field value, a black field value). The white field value, the gray field value, and the black field value range from 0 to 255. Therefore, the color level table includes $255^3$ color level values. The color level value is used to indicate brightness of an image.

Specifically, a color level value of the watermarked solid-color canvas is adjusted to each color level value in the color level table to obtain each corresponding watermark-restored canvas of the watermarked solid-color canvas.

S53: Determine a contrast between a color value of a watermarked pixel and a color value of a non-watermarked pixel in each watermark-restored canvas.

During specific implementation, the contrast between the color value of the watermarked pixel and the color value of the non-watermarked pixel in each watermark-restored canvas may be determined in the following manner:

determining the contrast of the corresponding watermark-restored canvas based on a difference between the color value of the watermarked pixel and the color value of the non-watermarked pixel in each watermark-restored canvas.

Specifically, for each watermark-restored canvas of any watermarked solid-color canvas, a contrast of the watermark-restored canvas is determined based on a difference between a color value of a watermarked pixel and a color value of a non-watermarked pixel in the watermark-restored canvas.

During implementation, a difference between a color value of a watermarked pixel and a color value of a non-watermarked pixel in a watermark-restored canvas may be determined as a contrast between the two color values, and the contrast between the two color values is a contrast of the watermark-restored canvas.

A difference between a color value of a watermarked pixel and a color value of a non-watermarked pixel in a watermark-restored canvas may be calculated by using the following formula:

$$D=|\sqrt{r_0^2+g_0^2+b_0^2}-\sqrt{r_1^2+g_1^2+b_1^2}|,$$

where D indicates a difference between a color value ($r_0$, $g_0$, $b_0$) of a watermarked pixel and a color value ($r_1$, $g_1$, $b_1$) of a non-watermarked pixel in a watermark-restored canvas, in other words, D indicates a contrast between a color value of a watermarked pixel and a color value of a non-watermarked pixel in a watermark-restored canvas. This formula may be understood as follows: A distance difference between a color value ($r_0$, $g_0$, $b_0$) and a color value ($r_1$, $g_1$, $b_1$) in color space is calculated by using R, G, B as three vector axes for two points ($r_0$, $g_0$, $b_0$) and ($r_1$, $g_1$, $b_1$) in three-dimensional space.

The difference between a color value of a watermarked pixel and a color value of a non-watermarked pixel in a watermark-restored canvas may also be calculated by using other distance formulas, for example, a Euclidean distance or a Mahalanobis distance. This is not limited in this embodiment of this application.

S54: Select a color level value, from a color level value corresponding to a watermark-restored canvas whose contrast is greater than a specified threshold, as a restoring color level value corresponding to a color value of a pixel in a corresponding solid-color canvas prior to being watermarked.

During specific implementation, when a contrast between a color value of a watermarked pixel and a color value of a non-watermarked pixel in a watermark-restored canvas is larger, watermark information in the watermark-restored canvas can be more clearly displayed. Based on this, any color level value may be selected, from a color level value corresponding to a watermark-restored canvas whose contrast is greater than the specified threshold, as a restoring color level value corresponding to a color value of a pixel in a solid-color canvas prior to being watermarked and that corresponds to the watermark-restored canvas. The specified threshold may be set according to a requirement, provided that watermark information can be clearly displayed.

In an implementation, a color level value corresponding to a watermark-restored canvas in a case that a contrast between a color value of a watermarked pixel and a color value of a non-watermarked pixel in the watermark-restored canvas is the largest may be selected as a restoring color level value corresponding to a color value of a pixel in a corresponding solid-color canvas prior to being watermarked. For example, after a specified watermark is added to a solid-color canvas in which color values of all pixels are (10, 10, 10), when a contrast between a color value of a watermarked pixel and a color value of a non-watermarked pixel in a watermark-restored canvas obtained through adjustment based on a color level value (244, 1, 255) ((a white field value, a gray field value, a black field value)) is the largest, the color level value (244, 1, 255) may be used as a restoring color level value corresponding to the color value (10, 10, 10).

S55: Obtain a correspondence between a color value and a restoring color level value based on each color value and a restoring color level value corresponding to the color value.

During specific implementation, after a restoring color level value corresponding to each color value is obtained, a correspondence between each color value and a restoring color level value is stored.

S46: Adjust a color level of the image with the to-be-restored watermark based on the restoring color level value to obtain an image with a restored watermark.

During specific implementation, the watermark restoration component adjusts the color level of the image with the to-be-restored watermark to the restoring color level value that corresponds to the reference color value and that is found through querying, to obtain the image with the restored watermark.

Figure 7A:
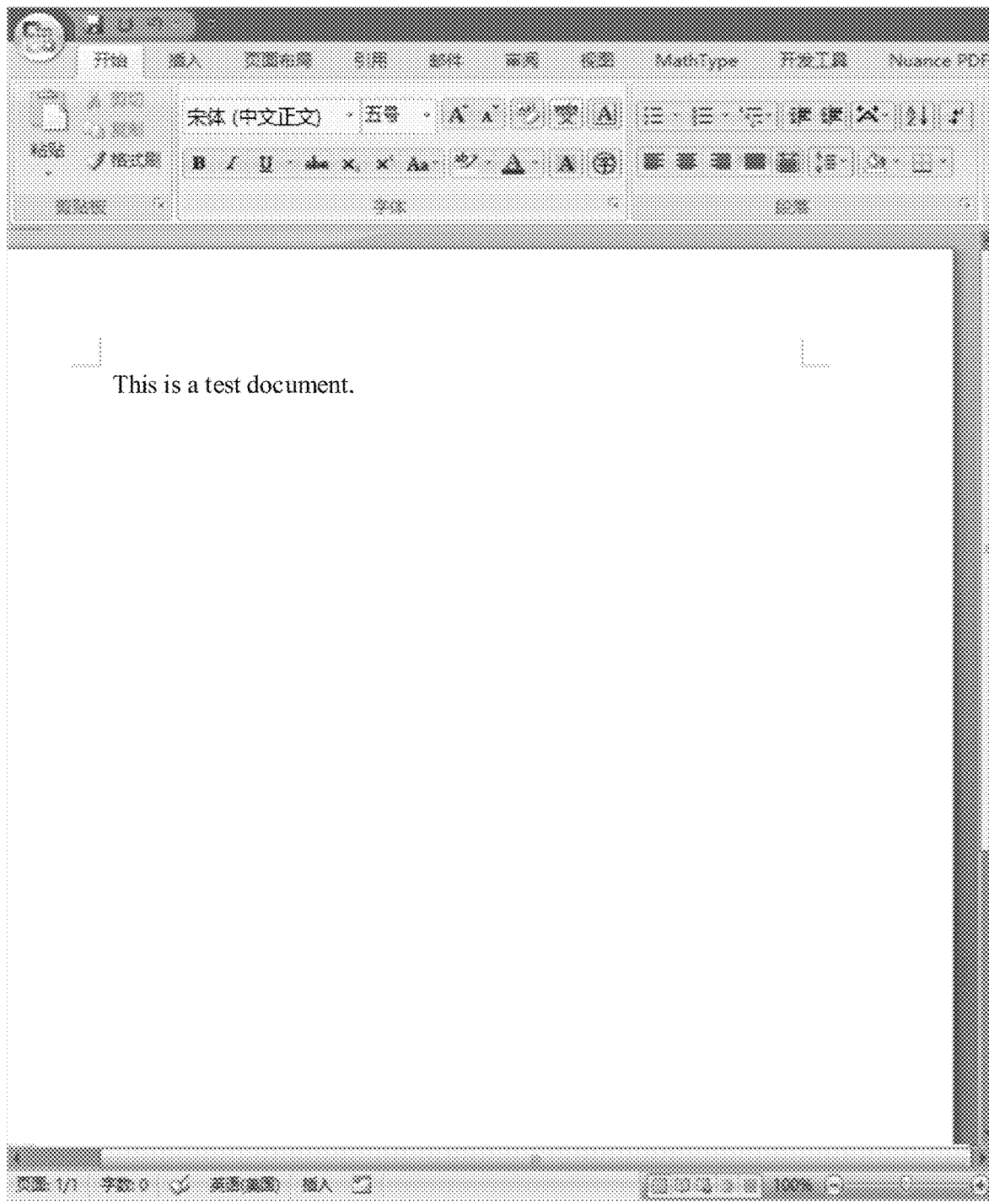
FIG. 7A is an example diagram of an image to which watermark information is added according to an embodiment of this application.
Figure 7B:
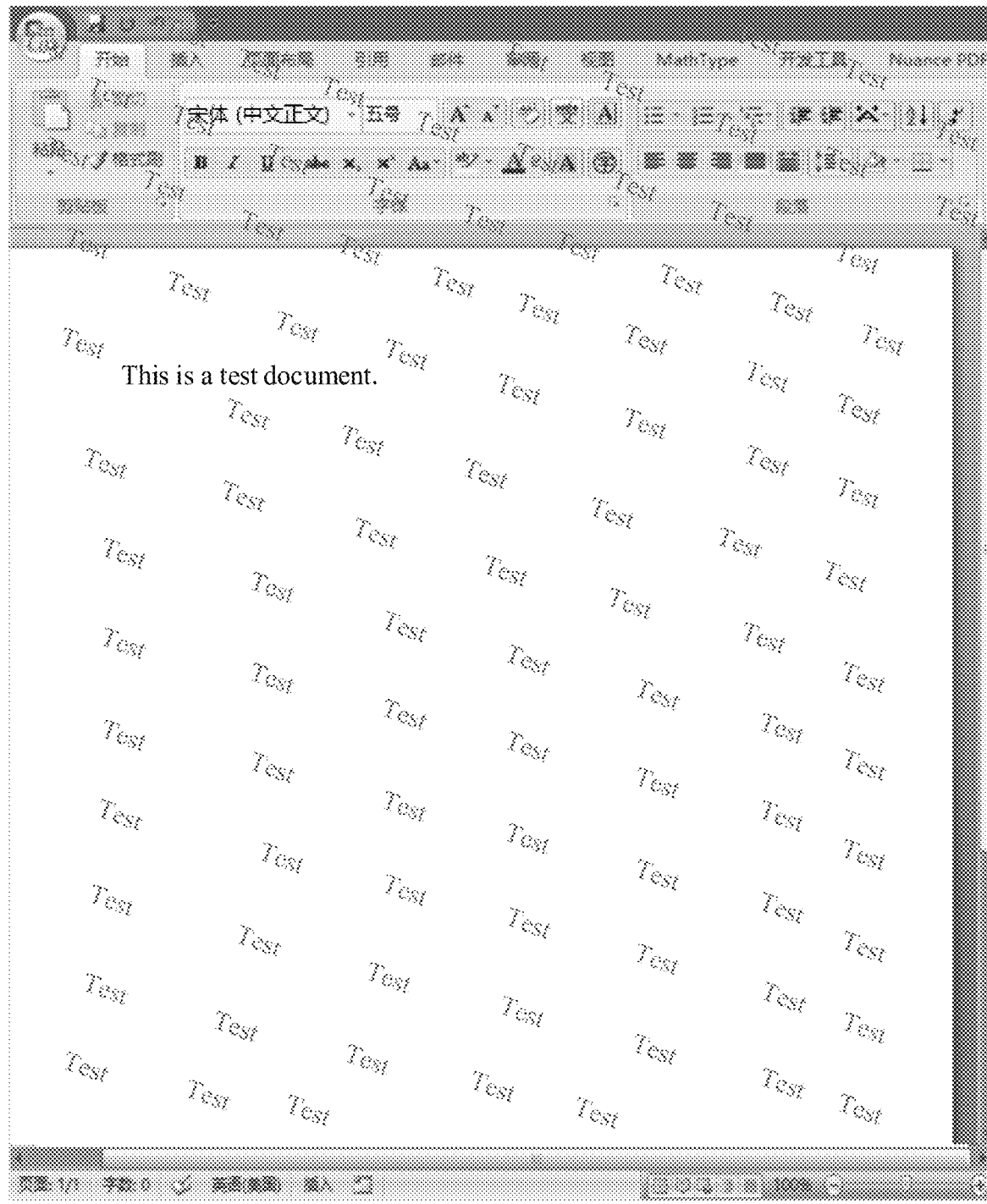
FIG. 7B is an example diagram of an image with a restored watermark according to an embodiment of this application.

In an embodiment, an image to which watermark information is added is shown in FIG. 7A, and the watermark information is unperceivable to naked eyes. An image with a restored watermark is shown in FIG. 7B, and added watermark information "Test" is clearly displayed in FIG. 7B.

In the embodiments of this application, during watermarking, watermark information is drawn on a transparent image layer on a screen of a user terminal without changing original information of an image, and the watermark information may still be successfully restored even if the image is cut, zoom-out, or zoom-in, or undergoes other operations.

According to the watermark processing method provided in the embodiments of this application, a terminal obtains to-be-inserted watermark information by using a watermarking component, sets a transparent image layer on a display screen of the terminal, and draws the watermark information on the transparent image layer at specified transparency. In this way, the watermark information is drawn on the transparent image layer on the screen of the user terminal without inserting the watermark information into an original image, so that integrity of the original image is not changed. When a user captures, by using screenshot software of the terminal, a screenshot generated based on content of an electronic document being viewed, or records a video by using screen recording software, a system hook technology of the terminal can ensure that an image frame obtained by the screenshot or screen recording software carries unperceivable watermark information. Further, the terminal obtains an image with a to-be-restored watermark by using watermark restoration component, divides the image with the to-be-restored watermark into a corresponding quantity of image blocks based on a preset size; obtains a first color value with a largest quantity among color values of pixels in each image block respectively; determines a first color value with a largest quantity among all first color values as a reference color value; determines, based on a preset correspondence between a color value and a restoring color level value, a restoring color level value corresponding to the reference color value; and adjusts a color level of the image with the to-be-restored watermark based on the restoring color level value to obtain an image with a restored watermark. In this way, watermark information may be directly restored from a screenshot or an image frame of a video through matching between a restoring color level value and a color value, without requiring a large quantity of watermark samples for training, so that applicability and watermark restoration efficiency are high, without occupying excessive computing resources.

Based on the same inventive concept, the embodiments of this application further provide a watermark processing apparatus. A principle of resolving a problem by the watermark processing apparatus is similar to that of the foregoing watermark processing method. Therefore, for implementation of the apparatus, refer to the implementation of the method. Repeated descriptions are omitted.

Figure 8:
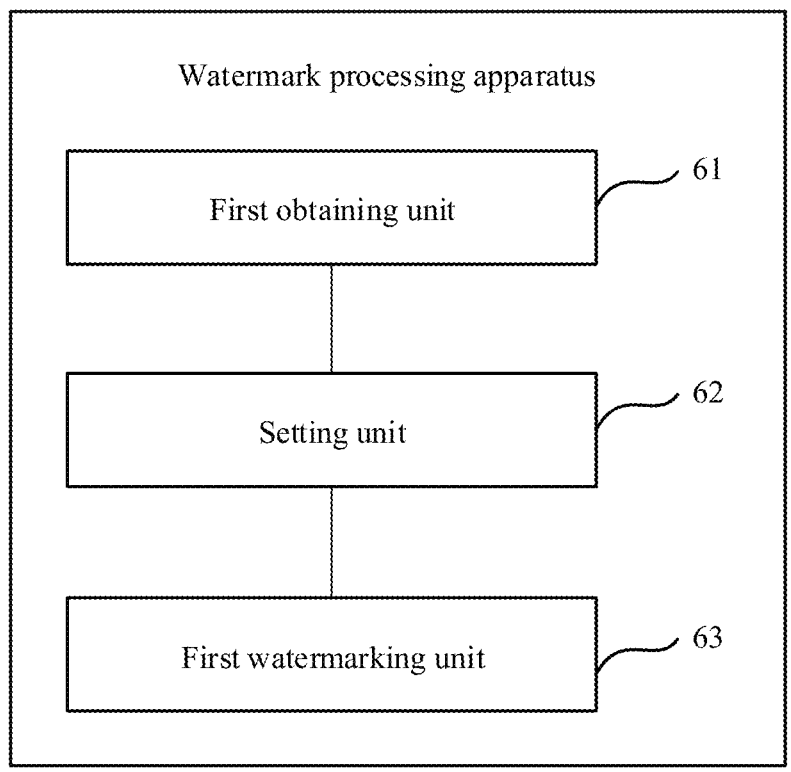
FIG. 8 is a schematic structural diagram of a watermark processing apparatus according to an embodiment of this application.

FIG. 8 is a schematic structural diagram of a watermark processing apparatus according to an embodiment of this application. The apparatus may include:

a first obtaining unit 61, configured to obtain to-be-inserted watermark information;

a setting unit 62, configured to set a transparent image layer on a display screen of a terminal; and a first watermarking unit 63, configured to draw the watermark information on the transparent image layer at specified transparency.

In a possible implementation, the setting unit 62 is specifically configured to: determine a size of an image layer window based on a size of the display screen of the terminal; draw the image layer window into transparent by using a transparent brush to obtain the transparent image layer; and set the transparent image layer at a top layer of the display screen of the terminal.

In a possible implementation, the apparatus further includes:

a second obtaining unit, configured to obtain an image with a to-be-restored watermark, where the image with the to-be-restored watermark is an image captured by the terminal or an image frame of a video recorded by the terminal;

a division unit, configured to divide the image with the to-be-restored watermark into a corresponding quantity of image blocks based on a preset size;

a third obtaining unit, configured to obtain a first color value with a largest quantity among color values of pixels in each image block respectively;

a first determining unit, configured to determine a first color value with a largest quantity among all first color values as a reference color value;

a second determining unit, configured to determine, based on a preset correspondence between a color value and a restoring color level value, a restoring color level value corresponding to the reference color value; and a watermark restoration unit, configured to adjust a color level of the image with the to-be-restored watermark based on the restoring color level value to obtain an image with a restored watermark.

In a possible implementation, the apparatus further includes:

a second watermarking unit, configured to draw, at the specified transparency, a specified watermark on a solid-color canvas corresponding to each color value, to obtain a corresponding watermarked solid-color canvas;

a color level adjustment unit, configured to: for each watermarked solid-color canvas, adjust a color level of the watermarked solid-color canvas based on each color level value to obtain each corresponding watermark-restored canvas;

a third determining unit, configured to determine a contrast between a color value of a watermarked pixel and a color value of a non-watermarked pixel in each watermark-restored canvas;

a selection unit, configured to select a color level value, from a color level value corresponding to a watermark-restored canvas whose contrast is greater than a specified threshold, as a restoring color level value corresponding to a color value of a pixel in a corresponding solid-color canvas prior to being watermarked; and an obtaining unit, configured to obtain the correspondence based on each color value and a restoring color level value corresponding to the color value.

In a possible implementation, the third determining unit is specifically configured to determine the contrast of the corresponding watermark-restored canvas based on a difference between the color value of the watermarked pixel and the color value of the non-watermarked pixel in each watermark-restored canvas.

In a possible implementation, the apparatus further includes:
- a response unit, configured to respond to a screenshot operation or a screen recording operation performed on the terminal; and
- a writing unit, configured to write, by using a hook function, the watermark information into an image captured by the terminal or a video recorded by the terminal.

Figure 9:
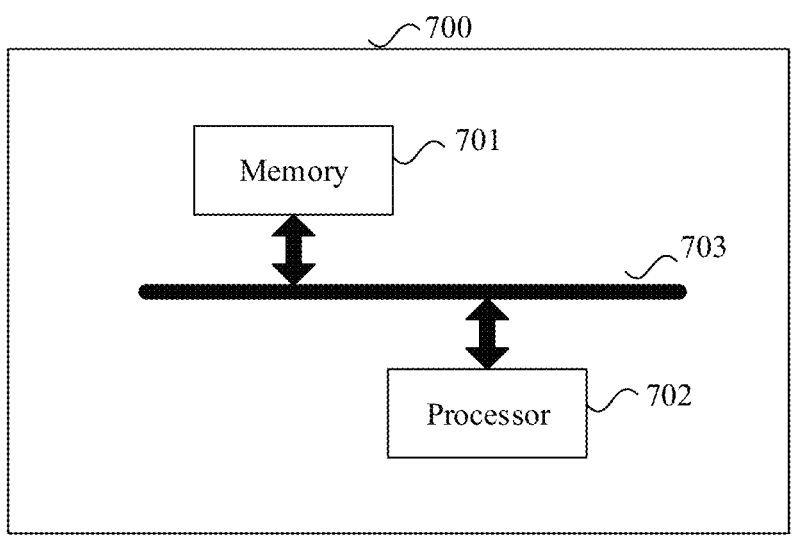
FIG. 9 is a schematic structural diagram of an electronic device according to an embodiment of this application.

Based on the same technical concept, an embodiment of this application further provides an electronic device 700. As shown in FIG. 9, the electronic device 700 is configured to implement the watermark processing method described in the foregoing method embodiments. The electronic device 700 in this embodiment may include a memory 701, a processor 702, and a computer program stored in the memory and capable of running on the processor, for example, a watermark processing program. When the processor executes the computer program, the steps in the foregoing embodiments of the watermark processing method are implemented.

A specific connection medium between the memory 701 and the processor 702 is not limited in this embodiment of this application. In this embodiment of this application, in FIG. 9, the memory 701 and the processor 702 are connected through a bus 703. The bus 703 is represented by a bold line in FIG. 9. A connection manner between other components is described merely as an example and does not constitute a limitation. The bus 703 may be categorized as an address bus, a data bus, a control bus, or the like. For ease of representation, only one bold line is used to represent the bus in FIG. 9, but this does not mean that there is only one bus or only one type of bus.

The memory 701 may be a volatile memory (volatile memory), for example, a random access memory (random access memory, RAM); or the memory 701 may be a non-volatile memory (non-volatile memory), for example, a read-only memory, a flash memory (flash memory), a hard disk drive (hard disk drive, HDD), or a solid-state drive (solid-state drive, SSD); or the memory 701 is any other medium that can be used to carry or store expected program code in a form of an instruction or a data structure and that can be accessed by a computer, but is not limited thereto. The memory 701 may be a combination of the foregoing memories.

The processor 702 is configured to implement the watermark processing method in various exemplary embodiments of this application.

An embodiment of this application further provides a computer-readable storage medium for storing computer-executable instructions that need to be executed by the processor, and the computer-executable instructions include a program that needs to be executed by the processor.

In some possible implementations, various aspects of the watermark processing method provided in this application may be further implemented in a form of a program product, which includes program code. When the program product runs on an electronic device, the program code is used to enable the electronic device to perform the steps of the foregoing watermark processing method according to various exemplary embodiments of this application described in the specification.

A person skilled in the art should understand that the embodiments of this application may be provided as a method, an apparatus, or a computer program product. Therefore, this application may use a form of a hardware-only embodiment, a software-only embodiment, or an embodiment with a combination of software and hardware. In addition, this application may be implemented in a form of a computer program product that is implemented on one or more computer-usable storage media (including but not limited to a disk memory, a CD-ROM, an optical memory, and the like) that include computer-usable program code.

This application is described with reference to the flowcharts and/or the block diagrams of the method, the device (apparatus), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the other programmable device, to generate computer-implemented processing. Therefore, the instructions executed on the computer or the other programmable device provide steps for implementing a specific function in one or more processes in the flowcharts and/or in one or more blocks in the block diagrams.

Although preferred embodiments of this application have been described, persons skilled in the art can make additional changes and modifications to these embodiments once they learn the basic inventive concept. Therefore, the appended claims shall be construed to cover the preferred embodiments and all changes and modifications falling within the scope of the embodiments of this application.

Apparently, a person skilled in the art can make various changes and variations to this application without departing from the spirit and scope of this application. Therefore, this application is also intended to cover the changes and variations provided that the changes and variations of this application fall within the scope of the claims of this application or equivalent technologies thereof.

What is claimed is:

1. A watermark processing method, comprising:
   obtaining to-be-inserted watermark information;

setting a transparent image layer on a display screen of a terminal based on a size of an image layer window, wherein the size of the image layer window is determined based on a size of the display screen of the terminal;

drawing the watermark information on the transparent image layer at specified transparency;

obtaining an image with a to-be-restored watermark, wherein the image with the to-be-restored watermark is an image captured by the terminal or an image frame of a video recorded by the terminal;

dividing the image with the to-be-restored watermark into a corresponding quantity of image blocks based on a preset size;

obtaining a first color value with a largest quantity among color values of pixels in each image block respectively;

determining a first color value with a largest quantity among all first color values as a reference color value;

determining, based on a correspondence between a preset second color value and a first restoring color level value, a restoring color level value corresponding to the reference color value; and adjusting a color level of the image with the to-be-restored watermark based on the restoring color level value corresponding to the reference color value, to obtain an image with a restored watermark.

2. The method according to claim 1, wherein the setting the transparent image layer on a display screen of the terminal based on the size of the image layer window comprises:

drawing the image layer window into transparent by using a transparent brush to obtain the transparent image layer; and setting the transparent image layer at a top layer of the display screen of the terminal.

3. The method according to claim 1, wherein the method further comprises:

determining whether the display screen of the terminal comprises a plurality of sub-screens; and when the display screen of the terminal comprises the plurality of sub-screens, determining the size of the image layer window based on sizes of the plurality of sub-screens.

4. The method according to claim 3, wherein the determining the size of the image layer window based on the sizes of the plurality of sub-screens comprises:

arranging the plurality of sub-screens according to a preset rule, wherein a size of each sub-screen is a corresponding size in a maximum resolution.

5. The method according to claim 4, wherein the arranging the plurality of sub-screens according to the preset rule comprises:

arranging each sub-screen in a diagonal line.

6. The method according to claim 1, wherein the method further comprises:

drawing, at the specified transparency, a specified watermark on a solid-color canvas corresponding to each color value, to obtain a corresponding watermarked solid-color canvas;

for each watermarked solid-color canvas, adjusting a color level of the watermarked solid-color canvas based on each color level value to obtain a plurality of corresponding watermark-restored canvases;

determining a contrast between a color value of a watermarked pixel and a color value of a non-watermarked pixel in each watermark-restored canvas;

selecting a color level value, from at least one color level value corresponding to a watermark-restored canvas whose contrast is greater than a specified threshold, as a first restoring color level value corresponding to a second color value of a pixel in a corresponding solid-color canvas prior to being watermarked; and obtaining the correspondence based on the second color value and the first restoring color level value corresponding to the second color value.

7. The method according to claim 6, wherein the determining a contrast between a color value of a watermarked pixel and a color value of a non-watermarked pixel in each watermark-restored canvas comprises:

determining the contrast of the corresponding watermark-restored canvas based on a difference between the color value of the watermarked pixel and the color value of the non-watermarked pixel in each watermark-restored canvas.

8. The method according to claim 7, wherein the difference is a distance difference between the color value of the watermarked pixel and the color value of the non-watermarked pixel in each watermark-restored canvas.

9. The method according to claim 8, wherein the difference is determined by using the following formula:

$$D=|\sqrt{r_0^2+g_0^2+b_0^2}-\sqrt{r_1^2+g_1^2+b_1^2}|,$$

wherein $(r_0, g_0, b_0)$ is the color value of the watermarked pixel in the watermark-restored canvas, $(r_1, g_1, b_1)$ is the color value of the non-watermarked pixel in the watermark-restored canvas, and D is the difference.

10. The method according to claim 6, wherein the for each watermarked solid-color canvas, adjusting a color level of the watermarked solid-color canvas based on each color level value to obtain a plurality of corresponding watermark-restored canvases comprises:

adjusting the color level value of each watermarked solid-color canvas into each color level value in a color level table to obtain the plurality of corresponding watermark-restored canvases.

11. The method according to claim 1, further comprising:

responding to a screenshot operation or a screen recording operation performed on the terminal; and writing, by using a hook function, the watermark information into an image captured by the terminal or a video recorded by the terminal.

12. An electronic device, comprising a memory, a processor, and a computer program stored in the memory and capable of running on the processor, wherein when the processor executes the program, the watermark processing method according to claim 1 is implemented.

13. A non-transitory computer-readable storage medium, wherein the computer-readable storage medium stores a computer program, and when the program is executed by a processor, the steps of the watermark processing method according to claim 1 are implemented.

* * * * *